Figure 4:
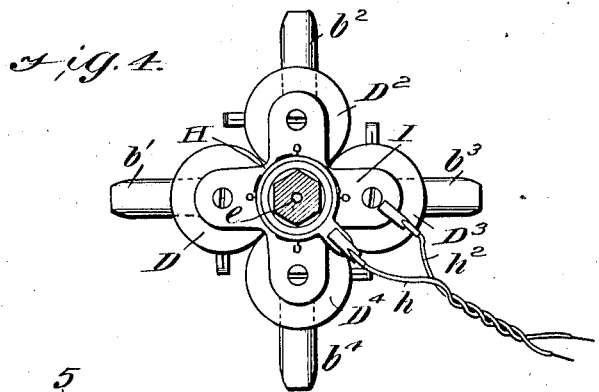

G. B. CRAMP.
ELECTRIC VACUUM MILKING MACHINE.
APPLICATION FILED JUNE 17, 1909.
952,978.
Patented Mar. 22, 1910.
4 SHEETS—SHEET 1.
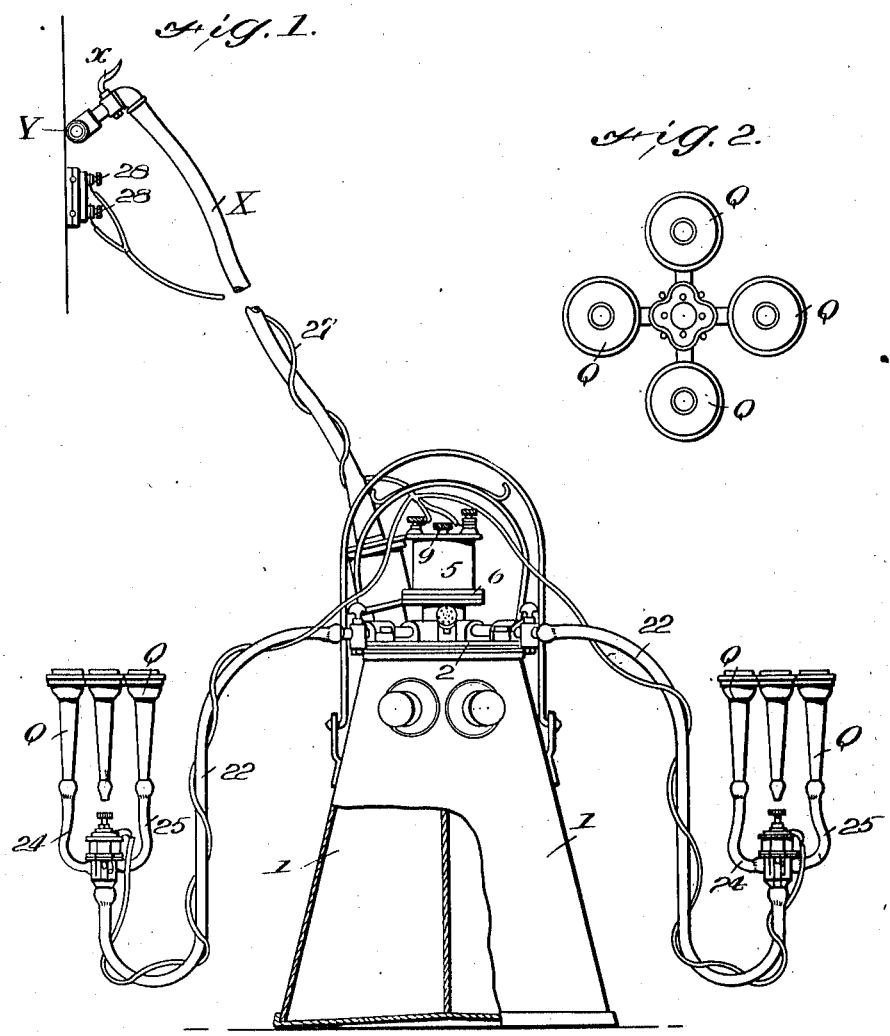
WITNESSES
T. C. Barry
L. A. Stanley
INVENTOR
GEORGE B. CRAMP
BY Munn & Co.
ATTORNEYS

G. B. CRAMP.
ELECTRIC VACUUM MILKING MACHINE.
APPLICATION FILED JUNE 17, 1909.

952,978.

Patented Mar. 22, 1910.
4 SHEETS—SHEET 2.

WITNESSES
T. C. Barry
L. A. Stanley

INVENTOR
GEORGE B. CRAMP
BY Munn & Co.
ATTORNEYS

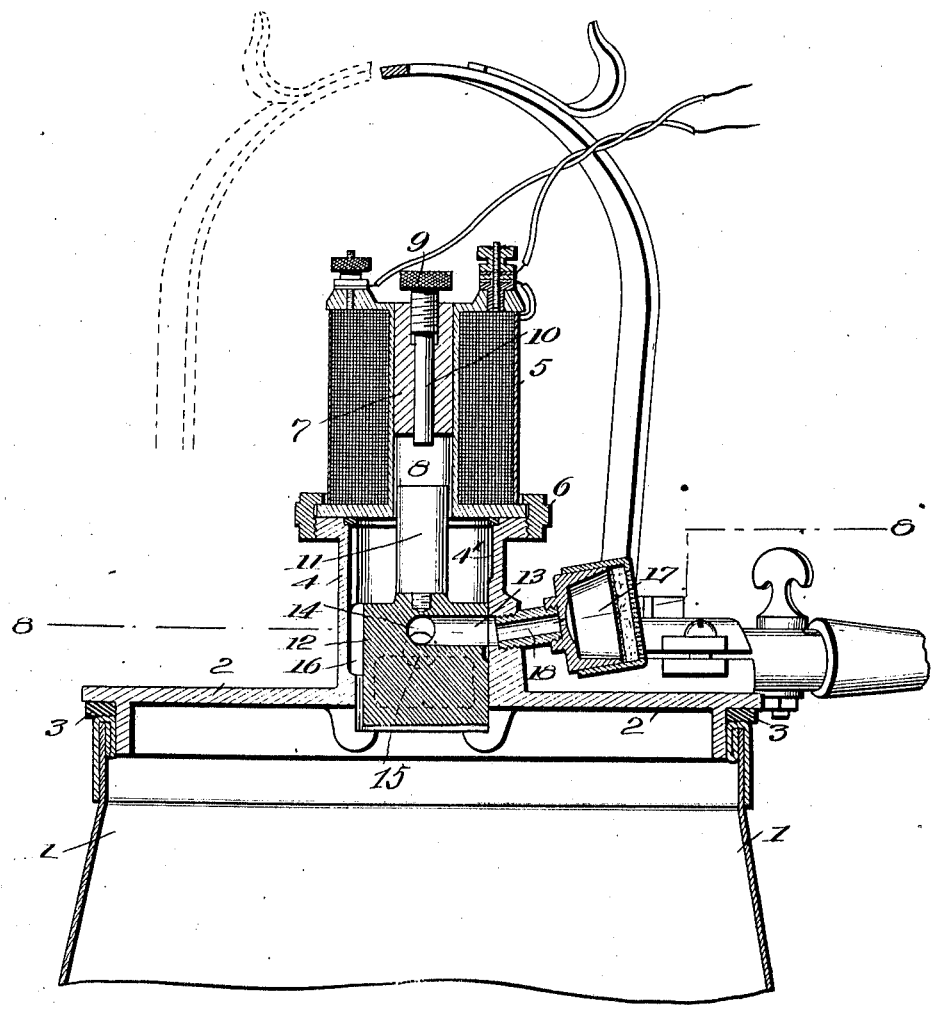

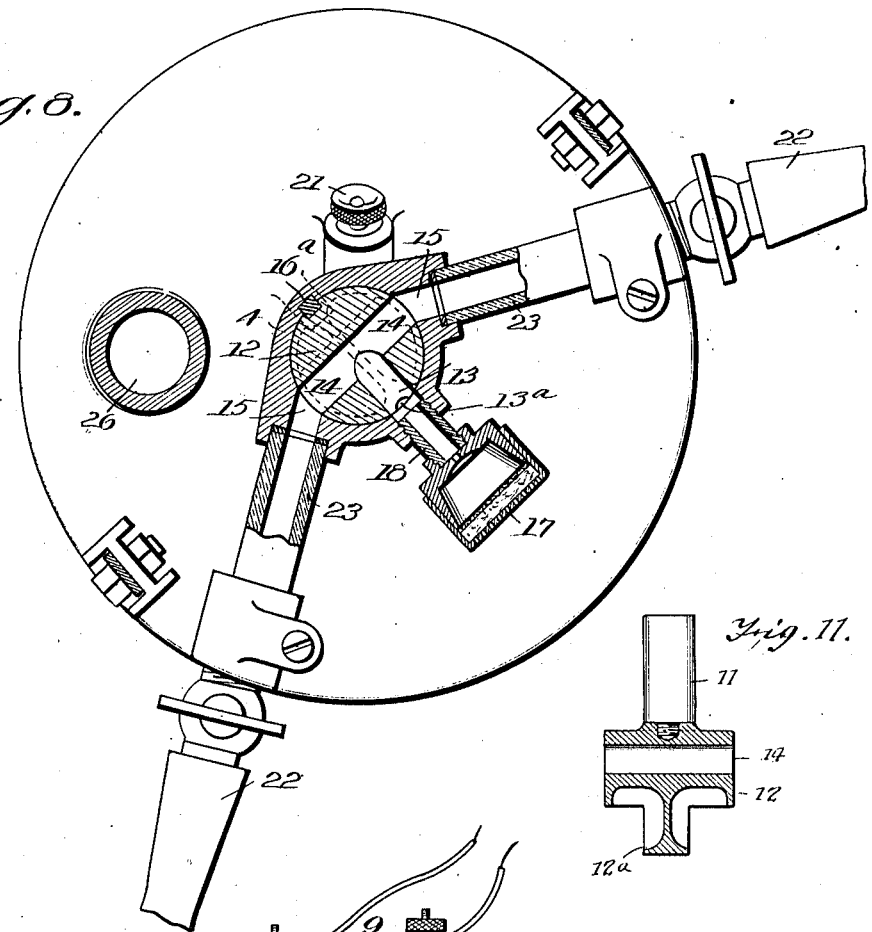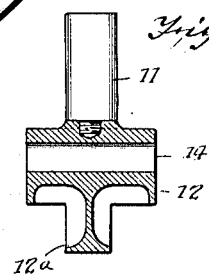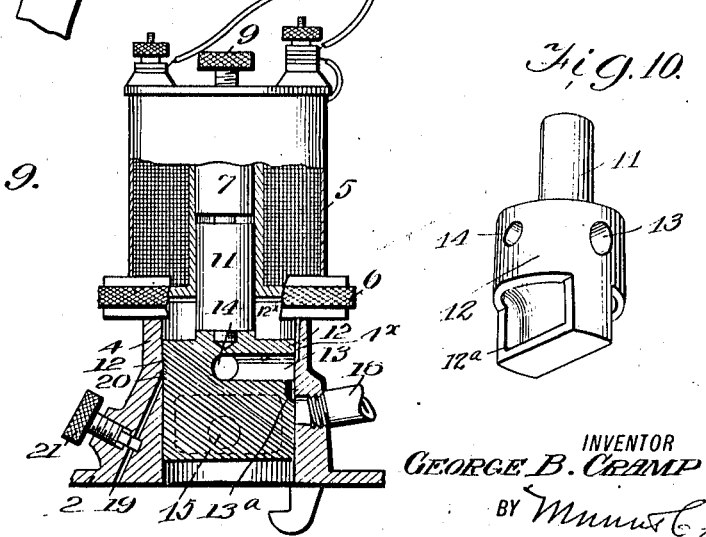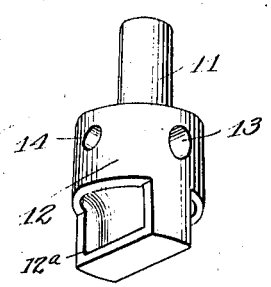

UNITED STATES PATENT OFFICE.

GEORGE BERKLEY CRAMP, OF DUQUESNE, PENNSYLVANIA.

ELECTRIC VACUUM MILKING-MACHINE.

952,978.    Specification of Letters Patent.    Patented Mar. 22, 1910.

Application filed June 17, 1909. Serial No. 502,716.

*To all whom it may concern:*

Be it known that I, GEORGE B. CRAMP, a citizen of the United States, and a resident of Duquesne, in the county of Allegheny and State of Pennsylvania, have made certain new and useful Improvements in Electric Vacuum Milking-Machines, of which the following is a specification.

My invention relates to improvements in electric vacuum milking machines and it consists in the combinations, constructions and arrangements herein described and claimed.

An object of my invention is to provide a device which is to a certain extent automatic in its operation and which will thereface, not require so much of the service of the attendant as in other devices which do not have this automatic feature.

A further object of my invention is to provide a special form of electro-magnetic automatic vacuum-shut-off valve for stopping the action of the vacuum on the cessation of the flow of milk thereby avoiding all danger of injury to the cow which may be more or less sensitive to an unnecessarily continued operation.

A further object of my invention is to provide a device whose operation more nearly simulates that of the manual operation than those heretofore made.

A further object of my invention is to provide an electro-magnetic vacuum-air pulsator for alternately shutting off and applying a vacuum to the milking tubes, the disconnection between the pulsator and the pail being easily accomplished so as to permit of a thorough cleaning of the top of the pail by immersion in water if necessary, without injury to any of the other working parts of the machine.

Other objects and advantages will appear in the following specification and the novel features of the device will be particularly pointed out in the appended claims.

My invention is illustrated in the accompanying drawings in which similar reference characters indicate like parts in the several views and in which—

Figure 3:
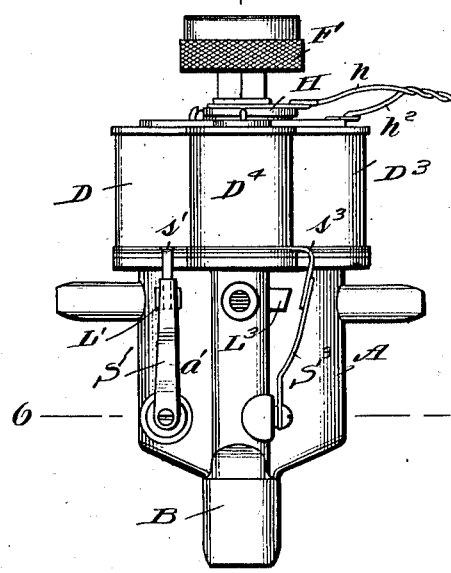
Figure 5:
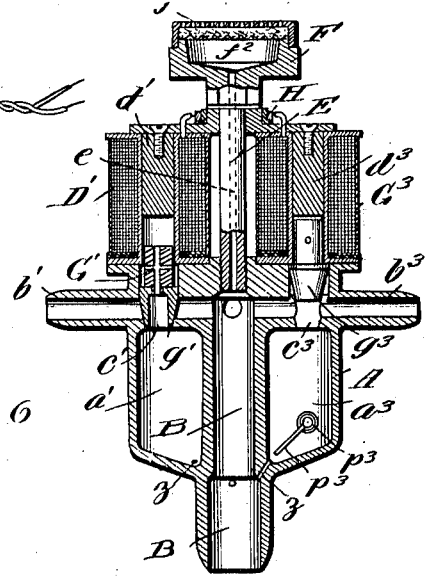
Figure 6:
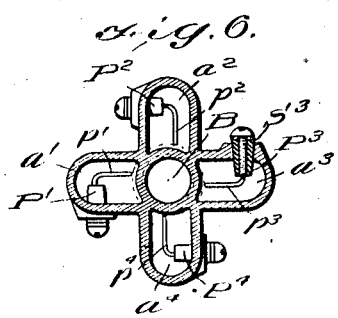

Figure 1 is a side view showing the apparatus comprising my invention; Fig. 2 is a detail plan view of the teat cups; Fig. 3 is a side view of one of the automatic vacuum shut-off valves; Fig. 4 is a plan view of the parts shown in Fig. 3, the air filter being removed; Fig. 5 is a vertical section along the line 5—5 of Fig. 3; Fig. 6 is a horizontal section along the line 6—6 of Fig. 3; Fig. 7 is a vertical section through the electromagnetic vacuum air pulsator; Fig. 8 is a sectional view along the line 8—8 of Fig. 7; and Fig. 9 is a vertical central section through the pulsator proper at right angles to the section shown in Fig. 7; Fig. 10 is a perspective view of the valve of the pulsator; Fig. 11 is a section through the valve of the pulsator.

In order to give a clear explanation of the operation and advantages of my improved milking device, it will be necessary to consider the conditions which the machine has to meet. In the ordinary milking operation when the flow of milk from a teat stops it will be found that on returning afterward the flow may be again started. If then the operation is discontinued at the first cessation of the flow of milk the milking operation will then be incomplete, unless the cow is stripped by hand. Moreover with the ordinary milking machine the attendant has no way of knowing when the milking operation has been completed and it is necessary that he allow the machine to operate until there is no longer a flow, which as stated before, will sometimes result in injury to the cow.

In order to provide a device in which the vacuum is automatically shut off when the flow of milk is stopped, I have constructed the apparatus which is shown in detail in Figs. 3 and 5.

Referring now particularly to Fig. 5, I have shown therein a main casing A which is provided with the four cells $a'$ $a^2$, $a^3$, and $a^4$, grouped about a central tube B and having the laterally extending tubes $b'$, $b^2$, $b^3$ and $b^4$, communicating with the main tube B, and with each of the cells through the respective openings $c'$, $c^2$, $c^3$ and $c^4$. Secured to the upper part of the casing are the magnets $D'$, $D^2$, $D^3$ and $D^4$. Each magnet being provided with a stationary metal core $d'$, $d^2$, $d^3$ and $d^4$ respectively. Extending from the top of the casing A and disposed centrally between the magnets is a tube E having a restricted central passage $e$. This tube bears at its top an air filter F having a screen $f$, through which the air may be drawn, and material $f^2$ for filtering the same. In the interior of each magnet is a movable armature $G'$, $G^2$, $G^3$ and $G^4$, to the lower end of which are secured the respective valves $g'$, $g^2$, $g^3$ and $g^4$, each valve being cored out at its center to reduce the weight and the armatures being perforated to permit the free operation of the valves. Each magnetic coil is connected at one end to a common ring H to which a battery wire $h$ see Fig. 3, is secured. The other end of each magnetic coil is connected to its respective spring contact $s'$, $s^2$, $s^3$, etc. The other battery wire $h^2$ is electrically connected with the plate I to which the cores are fastened and which is properly insulated from the magnet coils, but is in electrical connection with the casing A through the various parts of the framework. Secured in the walls of each of the cells is an insulated plug such as that shown at $P'$, $P^2$, $P^3$ or $P^4$ having the terminals $p'$, $p^2$, $p^3$ and $p^4$, the free end of each of the terminals being disposed in the lowest part of the cell and being in close proximity to the walls thereof as shown in Fig. 5. Each of the terminals $p'$, $p^2$, $p^3$ and $p^4$ is in electrical connection with the spring $S'$, $S^2$, $S^3$ or $S^4$ which bears on a companion spring $s'$, $s^2$, $s^3$ or $s^4$ at the upper end of the casing A. These springs are insulated from the plate I and the casing A and are so arranged that by pressing on the lower spring they may be both forced into electrical connection with a lug $L'$, $L^2$, $L^3$ or $L^4$, on the main casing A.

The pulsator is shown in Figs. 7, 8 and 9. In Fig. 7 the milk pail is shown at 1, and is provided with a cover 2 which fits closely to the can and is provided with the usual gasket or packing 3 to prevent the entrance of air. The cover 2 has a central integral extension 4 which forms the casing proper of the pulsator. A magnet 5 is secured to the top of the casing 4 by means of a threaded ring 6 as clearly shown in Fig. 7. The magnet 5 is provided with a core 7 which extends part-way into the central opening 8 and is provided with an adjusting screw 9 having a rod 10 for limiting the movement of the armature 11, this being one of the means for regulating the speed of the pulsator. The latter consists of a magnetic plunger to which is attached the valve mechanism for operating the pulsator. This valve mechanism consists of a cylindrical member 12 arranged to fit snugly on the inside of the casing 4. In one side of the valve 12 is a passage 13 leading to an opening 14 in one side of another portion of the valve. The latter opening is adapted to register with an opening 15 in the side of the casing 4. On one side of the interior of the casing 4 is a slot 16 for the reception of the key $16^a$ shown in Fig. 8, while on the opposite side is an air filter 17 of the form already described which communicates by means of a tube 18 with the interior of the valve 12 when the latter is in a certain position, as will be hereinafter explained.

Referring now to Fig. 9 in which the valve 12 is shown in a shifted position it will be seen that there is a small passage 19 leading from the bottom 2 to a point 20 which is above the top of the valve 12 when the latter is in its lower position and which is below the top of the valve when the valve is in its upper position as shown in Fig. 9. The opening through this passage may be regulated by means of a thumb screw 21, this being the second means for regulating the speed of the pulsator, which should be about twenty pulsations a minute.

In Figs. 7, 9 and 10 I have shown a central partition $12^a$ dividing the lower portion of the valve 12 into two parts. This is for the purpose of preventing the milk from one cow from falling into the side of the pail which is being filled by the milk of another cow when more than one cow is being milked.

In Fig. 8 I have shown the tubes 22 which lead to the teat cups, not shown. The latter may be of any approved type. Between the vacuum tubes 22 and the casing 4 are the glass observation tubes 23 which communicate with the openings 15 in the casing. The cylindrical valve 12 is kept from rotating by means of a key $16^a$, as shown in this figure.

Referring now to Figs. 1 and 2, I have shown therein the assemblage of the apparatus which constitutes the main features of the present invention. It will be seen that the milk receptacle or can 1 has connected with it in the manner already described the tubes 22 which connect at one end with the lower part of the tube B of the automatic shut-off valve. The tubes 24 and 25 are connected to the ends of the tubes $b'$ and $b^3$ respectively and lead to the teat cups Q. In the drawing I have shown three of these cups but obviously four would be provided for the four tubes $b'$, $b^2$, $b^3$ and $b^4$ or any number of cups may be used corresponding to the cells $a'$, $a^2$, $a^3$ and $a^4$. The tube X leads from the vacuum pipe Y and is connected with the milk pail through the opening 26, (see Fig. 8) in its top, the tube X being controlled by the stop-cock $x$. The various magnets receive current through the cable 27 which is secured to the connecting plug 28 which is connected with the source of current supply.

From the foregoing description of the various parts of the device the operation thereof may be readily understood.

The apparatus is arranged as thus described and the cups are applied to the teats of the cow. The vacuum pump is started and a vacuum is created inside of the milk receptacle 1. The magnet 7, it will be observed, is connected to the source of current and being energized tends to attract the armature 11 which takes the position shown in Fig. 9, uncovering the openings 15 leading to the tubes 22 thereby drawing the milk down into the cups and through these tubes into the receptacle 1. The passage 13 is still in connection with the tube 18, however, through a small downwardly extending passage 13ª, so that the air going in through the air filter 17 (see Fig. 8) passes up slowly into the tube 13, and thence into the space 12ˣ above the valve 12 by means of a recessed portion 4ˣ in the casing 4, the lower end of which, as clearly shown in Fig. 9, now registers with the upper portion of the tube 13. It will also be seen that the lower part of the passage 13ª is still in communication with the pipe 18, so that the air may pass directly into the space 12ˣ. With the additional pressure on top of the valve and a vacuum below, the valve is forced away from the magnet and drops into the position shown in Fig. 7. In this position the tube 13 registers with the tube 18 through which the air is drawn and as will be seen from Fig. 7, the opening 14 registers with the opening 15 leading to the teat cups thereby cutting off the vacuum and thus stopping the flow of milk. The downward movement of the valve 12 now has uncovered the passage 19 at the point 20 and the air in the space 12ˣ is therefore exhausted through the small passage 19. As soon as the pressure above the valve is lowered sufficiently the magnet again attracts its armature thereby carrying up the valve and again uncovering the opening 15 to the vacuum in the milk receptacle thereby drawing in the milk again. As soon as enough air is admitted above the valve the latter is forced away from the magnet into its lower position. At each upward movement of the valve the passage 19 is closed as is shown in Fig. 9. Thus a pulsating movement is maintained and the cups Q are intermittently subjected to the vacuums followed by alternate periods when the vacuums are relieved. This simulates the ordinary manual process of milking to a marked degree.

Referring now to the operation of the automatic shut-off device, the normal position of the valves $g'$, $g^2$, $g^3$ and $g^4$ is that of the valve $g'$ shown in Fig. 5. As soon as the vacuum pump is started or any time thereafter the operator presses one of the springs S', S², S³ or S⁴ thereby completing the circuit of the respective magnets D', D², D³ and D⁴ which draws up the valve and permits the suction to draw in the milk. Let us consider the tube $b^3$, through which the milk is now flowing. The milk comes through this tube, passes through the opening $c^3$ into the cell $a^3$ and soon covers up the terminal $p^3$. The moment this terminal is covered up an electrical connection is established for the magnet D³ which holds up its core and therefore keeps the valve $g^3$ open. The milk gradually runs out the small passage $z$ but as long as the terminal is covered the valve $g^3$ will be open. Now when the milk runs out of the chamber $a^3$ as when a teat refuses to give milk in return for the action being exerted upon it by the vacuum or when it has been completely exhausted of milk by the machine performing a complete operation, then the circuit of the magnet D³ is broken and the valve G³ drops down thereby closing both the connection of the tube $b^3$ with the tube B and also with the cell $a^3$ thus protecting the animal from injurious action by a continued operation of the vacuum, and also acting in response to a natural requirement which demands that the suction be discontinued when milk no longer flows from a teat. The admission of air to the restricted channel $e$ in the tube E prevents the rushing back of the milk into the tubes $b^s$, $b^2$, $b^3$ etc. when the suction has been relieved by means of the pulsator. Each of the other cells and valves work in precisely the same manner. It should be the duty of the operator at intervals to start the valve mechanism by pressing each spring S', S², S³ or S⁴ after which he may attend to other matters while the machine is working automatically. Each time the milk refuses to come, the particular valve belonging to the cell into which the milk is flowing shuts off the vacuum in the manner described. It will be only necessary for the operator to manipulate the contact springs a few times while with other machines he must necessarily watch the operation to see that the device is not working after all of the milk has been extracted. Moreover in most other devices there is no means for discontinuing the action on one cup after the operator is fully satisfied that there is no more milk to be obtained.

I claim:

1. In a vacuum milking machine, a series of teat cups, a vacuum milk receptacle, a valve casing, tubes connecting said cups with said valve casing, a common tube connecting said valve casing with said milk receptacle, means for alternately exhausting the air from and admitting to said common tube, and magnetically operated valves in said casing controlled by the flow of milk for shutting off the vacuum from said cups.

2. In a vacuum milking machine, a series of teat cups, a vacuum milk receptacle, a valve casing provided with separate cells, a tube connecting each of said cups with one of said cells, a magnetically controlled valve arranged to cut off communication between said cell and said cup, a common tube connecting said valve casing with said milk receptacle and an electro-magnet for each cell, controlled by the flow of milk, for actuating the valve.

3. In a vacuum milking machine, a series of teat cups, a vacuum milk receptacle, connections between said cups and said receptacle, and magnetic means for alternately exposing said cups to the vacuum in said receptacle, and to a normal air pressure, said means comprising a permanent magnet having an armature in the form of a piston, and a cylinder provided with openings and a passage, the movement of said piston being arranged to cover and uncover certain of said openings and to expose the upper end of said passage to the space above the piston, the other end of said passage being in communication with the vacuum, and means for admitting air at normal pressure above said piston.

4. In a vacuum milking machine, a plurality of teat cups, a valve casing divided into cells, valves in said valve casing, a central tube carried by said valve casing, laterally extending tubes connected with said central tube, said lateral tubes having openings into the cells, flexible tubes connecting said lateral tubes with said cups, and electro-magnetic means for simultaneously cutting off the communication of the central tube and a cell from the lateral tube.

5. In a vacuum milking machine, an automatic cut-off comprising a casing divided into cells, a central tube disposed between said cells, passages connecting each of said cells with said central tube, lateral tubes extending from said central tube and communicating with said cells, a valve for simultaneously shutting off the communication between said central tube and said lateral tubes and said cells and said lateral tubes, a series of magnets for actuating said valves, a terminal in each of said cells, the terminal being arranged to be electrically connected with the valve casing when submerged by a conducting liquid for operating the magnet controlling the communication with said cell.

6. In a vacuum milking machine, a pulsator having a permanent magnet provided with armature having the form of a piston, a cylindrical casing arranged to receive said piston and having a restricted passage therethrough, means for regulating the size of the passage, said cylinder having openings, one of said openings being exposed to the vacuum and arranged to be closed by movement of said cylinder, said movement also serving to expose the upper part of the passage to said vacuum, said cylindrical casing having communication with the outer atmosphere and being provided with a restricted passage arranged to register with passages in said piston to permit the air at normal pressure to enter the cylinder above said piston.

GEORGE BERKLEY CRAMP.

Witnesses:
FRANKLIN M. FARWELL,
RUFUS J. WYSOR.